F. REDDY.
NUT LOCK.
APPLICATION FILED MAY 17, 1919.
1,328,399. Patented Jan. 20, 1920.
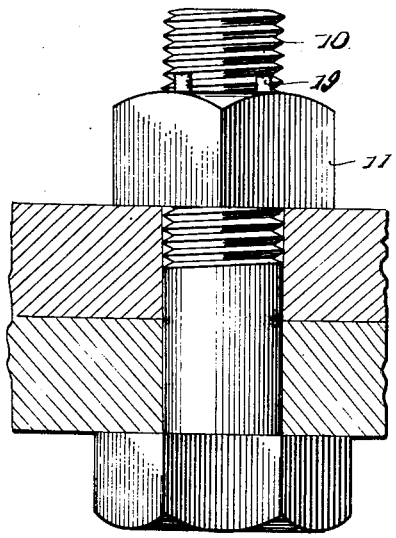
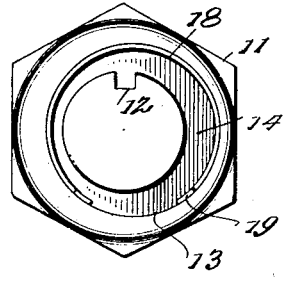
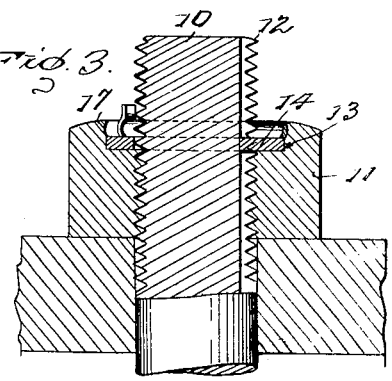
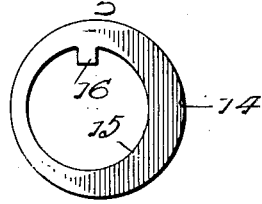
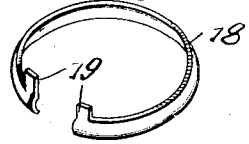
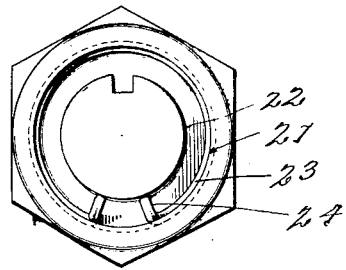
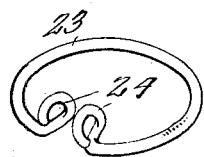
WITNESSES:
Frederick Reddy
INVENTOR
ATTORNEY

UNITED STATES PATENT OFFICE.

FREDERICK REDDY, OF OTTAWA, ONTARIO, CANADA.

NUT-LOCK.

1,328,399.

Specification of Letters Patent.   Patented Jan. 20, 1920.

Application filed May 17, 1919. Serial No. 297,797.

*To all whom it may concern:*

Be it known that I, FREDERICK REDDY, subject of the King of Great Britain, residing at Ottawa, Province of Ontario, Dominion of Canada, have invented certain new and useful Improvements in Nut-Locks, of which the following is a specification.

This invention has relation to nut locks, and has for an object to provide in combination a bolt of a specific nature and a nut to be threadedly engaged thereupon with means for preventing movement of the nut relative to the bolt after the former has been applied thereto and secured in place.

Another object of the invention is to provide a nut lock including a bolt having a longitudinal groove and a nut having a recess to receive an eccentric washer to prevent relative rotation of the bolt and nut, with means for securing the washer in place.

In addition to the foregoing, this invention comprehends improvements in the details of construction and arrangement of parts, to be hereinafter described and particularly set forth in the appended claim.

In the accompanying drawings in which similar and corresponding parts are designated by the same characters of reference throughout the several views in which they appear, Figure 1 is a view in elevation of a bolt and nut embodying my improvement.

Fig. 2 is a face view of the nut and bolt.

Fig. 3 is a longitudinal section taken through the combination of elements.

Fig. 4 is a plan view of the washer, and

Fig. 5 is a view in perspective of a spring securing member.

Figs. 6 and 7 are views in elevation and perspective of a modified form of invention.

With reference to the drawings, 10 indicates a bolt and 11 a nut applied thereto, the bolt having its threaded portion interrupted by a longitudinal square groove 12. The outer face of the nut is formed with a circular recess 13 formed eccentrically relative to the center of the nut or relative to the center of the opening therein through which the bolt passes in order to receive a washer 14 which is formed with an eccentric opening 15 to receive the bolt, an integral tongue 16 being formed with the washer to extend into the opening thereof and to engage in the groove 12 of the bolt when the washer is in place. It will be noted that the groove in the bolt is sufficiently deep to permit the washer to set therein and to lie below the surface of the nut, and the recess 13 of the nut is furthermore undercut or concaved as at 17 in order to receive a split spring band 18 which is curved transversely in cross section to closely fit within the concave portion 17 of the recess, a pair of lateral extensions 19 being formed upon the terminals of the spring band 18 to permit the terminals to be grasped and brought together in order to collapse the ring.

In use the nut is applied to the bolt and when screwed tightly into place the washer 14 is slipped over the bolt and seated into the recess of the nut with the tongue 16 extending into the groove 12 of the bolt as shown in Fig. 3. The terminals 19 of the spring band 18 are then grasped and brought together so as to reduce the diameter of the ring permitting the latter to be inserted in the recess of the nut whereupon by releasing the terminals of the band the latter may fly out to closely engage the concaved portion 17 of the recess of the nut and thereby secure the washer in place. It will be obvious that owing to the eccentric formation of the nut recess and the washer, relative movement of the bolt and nut after the parts are in place is absolutely precluded.

I have shown in Figs. 6 and 7 a modified form in which the nut 20 is formed with recesses 21 corresponding to the recess 13 but concentric relative to the bolt opening in which to receive the washer 22 having a concentric opening to receive the bolt and a tongue to enter the slot thereof. A spring 23 is employed formed of a strand of wire bent to circular formation with its terminals directed radially and inwardly and then formed with eyes 24. In this form the nut will be held against rotation due to the fact that the washer must move longitudinally of the bolt when the nut is rotated and such movement of the washer is prevented by the spring 23.

Thus it will be seen that I have provided a nut lock which is extremely simple in construction, comprises but few parts and which is efficient and positive in operation for the purpose desired. Other uses and advantages will readily occur to those familiar with the art to which this invention appertains.

While I have illustrated and described my invention with some degree of particularity, I realize that in practice various alterations therein may be made. I therefore reserve the right and privilege of changing the form of the details of construction or otherwise altering the arrangement of the correlated parts without departing from the spirit of the invention or the scope of the appended claim.

Having thus described my invention, what I claim as new and desire to secure by United States Letters Patent is:

A nut lock comprising a bolt having a longitudinal groove, a nut to fit the same and having its outer face formed with a circular recess disposed eccentric relative to the center of the bolt and the outer end of said recess further enlarged and concaved, a circular washer to fit the recess and having a circular opening eccentrically located therein to receive the bolt, a tongue formed on said washer extending into the opening thereof to seat in the groove of the bolt, and a ring formed with lateral terminals whereby the ring may be contracted, inserted in the recess and subsequently permitted to expand to seat in the concaved portion of said recess to secure the washer against dislodgment.

In testimony whereof I affix my signature in presence of a witness.

FREDERICK REDDY.

Witness:
WM. THOMAS.